(12) United States Patent
Dindar

(10) Patent No.: US 10,974,813 B2
(45) Date of Patent: Apr. 13, 2021

(54) ENGINE NACELLE FOR AN AIRCRAFT

(71) Applicant: General Electric Company, Schenectady, NY (US)

(72) Inventor: Mustafa Dindar, Evendale, OH (US)

(73) Assignee: General Electric Company, Schenectady, NY (US)

( * ) Notice: Subject to any disclaimer, the term of this patent is extended or adjusted under 35 U.S.C. 154(b) by 212 days.

(21) Appl. No.: 15/864,010

(22) Filed: Jan. 8, 2018

(65) Prior Publication Data
US 2019/0210710 A1 Jul. 11, 2019

(51) Int. Cl.
| | |
|---|---|
| *F02C 7/04* | (2006.01) |
| *B64C 7/02* | (2006.01) |
| *B64C 21/10* | (2006.01) |
| *F02K 3/06* | (2006.01) |
| *B64D 27/18* | (2006.01) |
| *B64D 33/02* | (2006.01) |

(52) U.S. Cl.
CPC ............... *B64C 7/02* (2013.01); *B64C 21/10* (2013.01); *B64D 27/18* (2013.01); *F02C 7/04* (2013.01); *F02K 3/06* (2013.01); *B64C 2230/26* (2013.01); *B64D 2033/0226* (2013.01); *F05D 2220/323* (2013.01)

(58) Field of Classification Search
CPC .... F02C 7/04; B64D 33/02; B64D 2033/0226
See application file for complete search history.

(56) References Cited

U.S. PATENT DOCUMENTS

| | | | |
|---|---|---|---|
| 3,652,036 A * | 3/1972 | Sans ..................... | B64C 11/001 244/53 B |
| 3,744,745 A | 7/1973 | Kerker et al. | |
| 3,960,345 A | 6/1976 | Lippert, Jr. | |
| 4,685,643 A | 8/1987 | Henderson et al. | |
| 5,156,362 A * | 10/1992 | Leon ..................... | B64C 23/06 244/130 |
| 5,249,762 A | 10/1993 | Skow | |
| 6,964,397 B2 | 11/2005 | Konings | |
| 8,087,617 B2 | 1/2012 | Sclafani et al. | |
| 8,181,912 B2 | 5/2012 | Schwetzler | |
| 8,544,799 B2 | 10/2013 | Da Silva | |
| 8,827,210 B2 | 9/2014 | Schwetzler | |
| 9,242,713 B2 | 1/2016 | D'Alascio et al. | |
| 2008/0267762 A1* | 10/2008 | Jain ..................... | B64C 23/00 415/2.1 |
| 2008/0286094 A1* | 11/2008 | Jain ..................... | B64D 33/02 415/148 |
| 2008/0310956 A1* | 12/2008 | Jain ..................... | B64D 33/02 415/200 |
| 2009/0301096 A1* | 12/2009 | Remy ..................... | F02C 3/30 60/773 |
| 2014/0077031 A1* | 3/2014 | Benedetti ................. | B32B 3/28 244/1 N |
| 2016/0097290 A1* | 4/2016 | Fulayter ................. | F01D 25/24 415/182.1 |
| 2016/0243806 A1* | 8/2016 | Frost ........................ | B64C 5/06 |

(Continued)

*Primary Examiner* — Gerald L Sung
(74) *Attorney, Agent, or Firm* — Dority & Manning, P.A.

(57) ABSTRACT

An engine nacelle is provided for an aircraft. The engine nacelle comprises: an inlet for receiving an air flow to generate a thrust force for the aircraft; a lip portion positioned at the inlet and surrounding the inlet; and at least one strake provided on a surface of the engine nacelle.

17 Claims, 7 Drawing Sheets

(56) References Cited

U.S. PATENT DOCUMENTS

2018/0334249 A1* 11/2018 Binks .................... B64D 29/00
2018/0371996 A1* 12/2018 Hoisington ............ B64D 27/18
2019/0061921 A1*  2/2019 Paolini .................. B64C 23/06

* cited by examiner

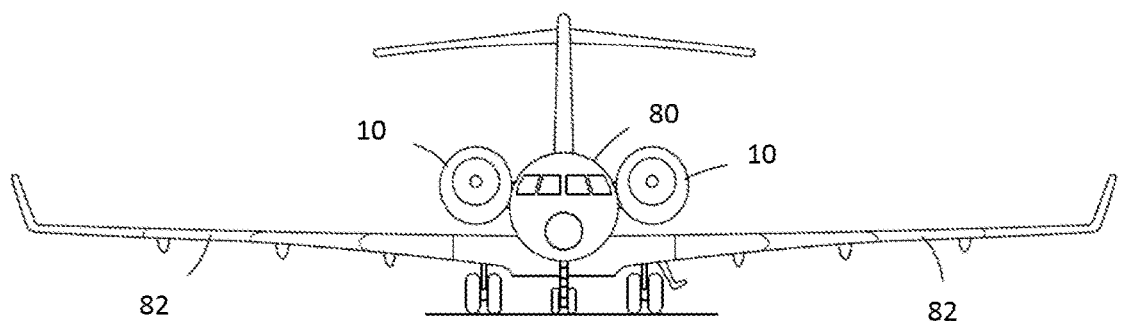
FIG. 2
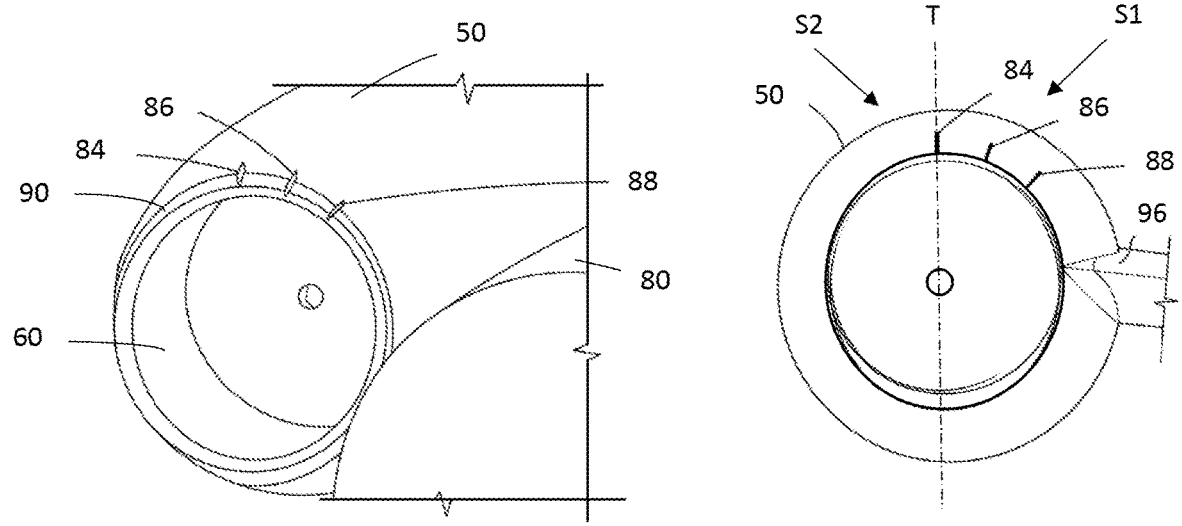
FIG. 3
FIG. 4

V1

94

ENGINE NACELLE FOR AN AIRCRAFT

FIELD OF THE INVENTION

The present subject matter relates generally to the field of aerodynamics, and more particularly to an apparatus for controlling and minimizing the effects of flow distortion to a turbofan jet engine.

BACKGROUND OF THE INVENTION

A modern high performance aircraft is typically comprises a fuselage, two wings extending laterally at two opposite sides of the fuselage and two engines, e.g., turbofan jet engines. A turbofan jet engine generally includes a fan covered by an engine nacelle and an engine core arranged in flow communication with the fan in the nacelle. A first portion of an air flow over the fan may flow past the core through a bypass airflow (defined between the core and the nacelle surrounding the core) and a second portion of the air flow over the fan may be provided to the core to provide combustion gases.

In some situations, two engines are respectively attached to the wings by a pylon and underneath a leading edge of the wings. In some other situations, the two engines, e.g., aft-fuselage mounted engines, are respectively mounted on two opposite sides of the fuselage.

An aircraft with the aft-fuselage mounted engines, often used for regional and business jet applications, may have a disadvantage of having a limited ground-wind operation range due to an inherent installation position of the engines and/or an inlet of the engines and associated airframe (e.g., fuselage, tail etc.) borne flow distortion that cannot be controlled by conventional inlet design parameters of the engines, such as inlet lip shape and/or size of a nacelle of the engines, etc.

Accordingly, an aircraft capable of controlling and minimizing the effects of an airframe borne flow distortion and hence help mitigate operability and aeromechanics risks to a turbomachinery would be beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an engine nacelle is provided. The nacelle for an aircraft comprises: an inlet for receiving an air flow to generate a thrust force for the aircraft; a lip portion positioned at the inlet and surrounding the inlet; and at least one strake provided on a surface of the engine nacelle.

In another exemplary embodiment of the present disclosure, a turbine engine is provided. The turbine engine for an aircraft comprises: an engine nacelle comprising an inlet for receiving an air flow to generate a thrust force and a lip portion positioned at the inlet and surrounding the inlet; an engine core received in the engine nacelle and comprising: a compressor section including one or more compressors; a combustion section located downstream of the compressor section; and a turbine section located downstream of the combustion section and including one or more turbines; wherein at least one strake is provided on a surface of the engine nacelle.

In still another exemplary embodiment of the present disclosure, an aircraft is provided. The aircraft comprises: a fuselage; a pair of airfoils extending from the fuselage; a pair of engine nacelles attached to the fuselage, each engine nacelle comprising an inlet for receiving air flow to generate a thrust force for the aircraft and a lip portion positioned at the inlet and surrounding the inlet; an engine core received in the engine nacelle and comprising: a compressor section including one or more compressors; a combustion section located downstream of the compressor section; and a turbine section located downstream of the combustion section and including one or more turbines; wherein at least one strake is provided on a surface of the engine nacelle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 is a schematic view of an aircraft with aft-fuselage mounted engines in accordance with an embodiment of the present disclosure.

FIG. 3 is a simplified, schematic view of a portion of an engine from FIG. 2 in accordance with an exemplary embodiment of the present disclosure.

FIG. 4 is a simplified, front view of an engine from FIG. 2 in accordance with an exemplary embodiment of the present disclosure.

DETAILED DESCRIPTION OF THE INVENTION

Figure 1:
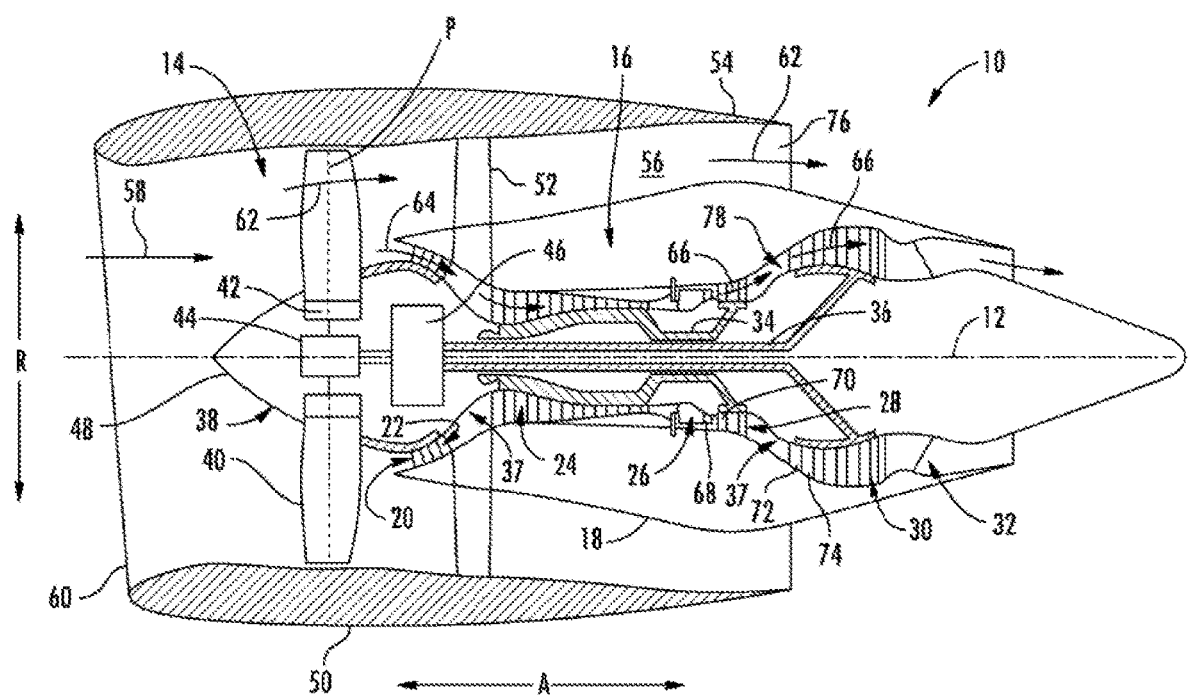
FIG. 1 is a schematic cross-sectional view of a gas turbine engine in accordance with an exemplary embodiment of the present disclosure.

As used herein, the terms "axial" or "axially" refer to a dimension along a longitudinal axis of an engine. The term "forward" or "upstream" used in conjunction with "axial" or "axially" refers to moving in a direction toward the engine inlet, or a component being relatively closer to the engine inlet as compared to another component. The term "aft" or "downstream" used in conjunction with "axial" or "axially" refers to a direction toward the rear or outlet of the engine relative to the engine centerline.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding, and do not create limitations, particularly as to the position, orientation, or use. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Aspects of the present disclosure provide an inlet distortion control arrangement for an aircraft with aft-fuselage mounted engines to control and minimize the effects of an airframe borne flow distortion and hence help mitigate operability and aeromechanics risks to a turbomachinery. For example, in certain exemplary embodiments, at least one aerodynamic strake is placed strategically at a surface of a lip portion of an inlet of an engine nacelle. Specifically, the at least one aerodynamics strake is designed to be either passive or actively controlled features for a system level weight/performance of the turbomachinery. The at least one aerodynamics strake is generally constant thickness plates. The orientation and a forward shape of the of the at least one aerodynamics strake may be streamlined or fin-shaped. The present disclosure may provide more lighter and better performance for a fan and other relevant turbomachinery components.

Referring now to the drawings, wherein identical numerals indicate the same elements throughout the figures, FIG. 1 is a schematic cross-sectional view of a gas turbine engine 10 in accordance with an exemplary embodiment of the present disclosure. The gas turbine engine is a high-bypass turbofan jet engine 10, referred to herein as "turbofan engine 10". As shown in FIG. 1, the turbofan engine 10 defines an axial direction A (extending parallel to a longitudinal centerline 12 provided for reference) and a radial direction R. The turbofan engine 10 may also define a circumferential direction C (not shown) extending circumferentially about the axial direction A. In general, the turbofan 10 includes a fan section 14 and a core turbine engine 16 disposed downstream from the fan section 14.

The exemplary core turbine engine 16 depicted is generally enclosed within a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flow path 37 therethrough.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24. The second portion of air 64 then flows into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration, including, for example, any other suitable number of shafts or spools. Additionally, or alternatively, aspects of the present disclosure may be incorporated into any other suitable gas turbine engine. For example, in other exemplary embodiments, aspects of the present disclosure may be incorporated into a turboshaft engine, a turbocore engine, a turboprop engine, a turbojet engine, etc.

FIG. 2 is a schematic view of an aircraft with aft-fuselage mounted engines, e.g., the turbofan engine 10 illustrated in FIG. 1 in accordance with an embodiment of the present disclosure. The aircraft comprises a fuselage 80, two wings 82 respectively extending laterally at two opposite sides of the fuselage 80 and two engines 10 respectively connected to two opposite sides of the fuselage 80. As shown in FIG. 2, the two engines 10 are arranged above the wings 82 in the radial direction A. It should be appreciated, however, that the exemplary aircraft with aft-fuselage mounted engines depicted in FIG. 2 is by way of example only, not to limit the present invention, and that in other exemplary embodiments, the aircraft may have any other suitable configuration, including, for example, any other suitable engines mounted underneath or on the wing 82.

Referring now to FIG. 3 and FIG. 4, FIG. 3 is a simplified, schematic view of a portion of an engine from FIG. 2 in accordance with an exemplary embodiment of the present disclosure, and FIG. 4 is a simplified, front view of an engine in accordance with an exemplary embodiment of the present disclosure. As shown in FIG. 4, two sides, inboard side S1 and outboard side S2, are defined on the nacelle 50 of the turbofan engine 10 referring to a radial line T. The radial line T is defined substantially orthogonal to the axial line 12 of the engine 10. Specifically, the inboard side S1 faces the fuselage 80 and is defined more closely to the fuselage 80 relative to the outboard side S2. In the exemplary embodiment, as shown in FIG. 3, a plurality of strakes, e.g., a first strake 84, a second strake 86 and a third strake 88 are arranged on a surface of a lip portion 90 of the nacelle 50 at the inboard side S1. The lip portion 90 of the nacelle 50 surrounds the inlet 60 of the turbofan engine 10. The plurality of strakes are spaced apart from one another in the circumferential direction C along a leading edge of the lip portion 90 of the nacelle. Although there are three strakes provided on the surface of the lip portion 90 in the exemplary embodiment, any number of strakes may be selectively arranged thereon in some other embodiment. Additionally, the plurality of strakes may extend from any area of the surface of the lip portion 90 in any direction or placed anywhere on the nacelle 50.

Furthermore, as shown in FIG. 4, the nacelle 50 is attached to the fuselage 80 (shown in FIG. 2) by means of a pylon 96. The first strake 84 is provided on a top position (i.e., at a 12:00 position or a position interacted with the radial line T) of the lip portion 90 of the nacelle 50 along the radial direction R, and the second strake 86 and third strake 88 are positioned at the inboard side S1 of the nacelle 50. More particularly, the third strake 88 is positioned more closely to the fuselage 80 than the second strake 86. It should be appreciated that, in some other non-limiting examples, one or more strakes may be selectively arranged on the inboard side S1 and/or the outboard side S2 to cover potential range of vortex trajectory on both sides of the nacelle 50 as the position of the vortex may change depending on the direction of the ground winds. For example, in one exemplary embodiment, at least one strake is placed on the inboard side S1 and at least one strake is placed on the outboard side S2. In another embodiment, only at least one strake is provided on the outboard side S2 and no strakes are on the inboard side S1. In still a further exemplary embodiment, one strake is arranged on the top position of the lip surface 90 of the nacelle 50, at least one strake is provided on the inboard side S1, and at least one strake is provided on the outboard side S2. Due to the different direction of the wind coming to the engine, any number of strakes may be selectively provided on any side of the nacelle 50. As disclosed in the exemplary embodiment, the first strake 84, the second strake 86 and the third strake 88 are designed with an aerodynamic geometry and placed at the surface of the lip portion 90 of the nacelle 50 to control and minimize the effects of airframe borne flow distortion and hence help mitigate operability and aeromechanics risks to the turbomachinery.

Figure 5:
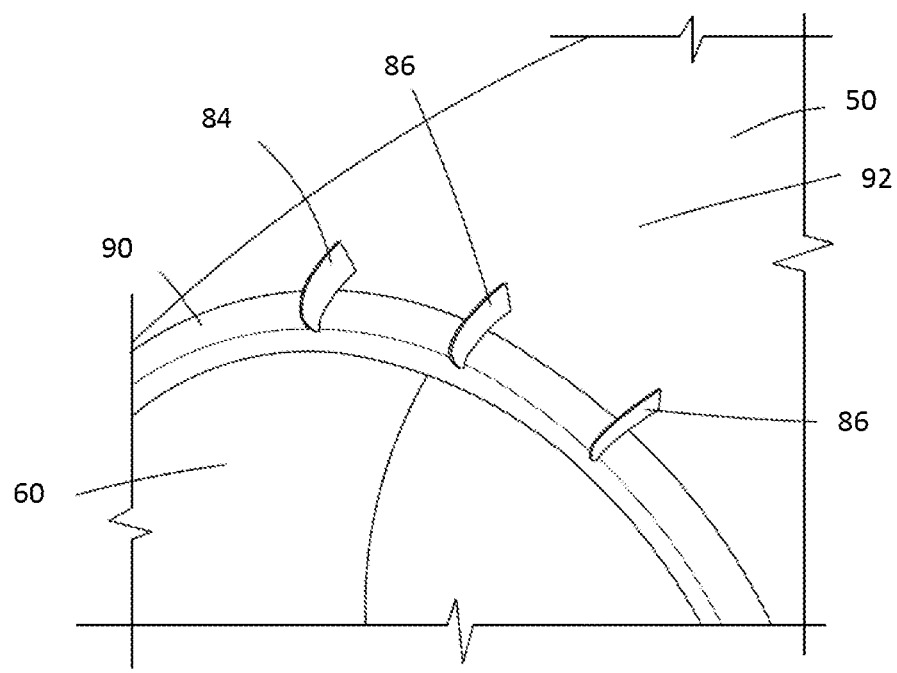
FIG. 5 is a simplified, enlarged schematic view of a portion of the engine shown in FIG. 3 in accordance with an exemplary embodiment of the present disclosure.

As shown in FIG. 5, a simplified, enlarged schematic view of a portion of the engine shown in FIG. 3 in accordance with an exemplary embodiment of the present disclosure, the first, second, third strakes 84, 86, 88 are provided on the lip portion 90 of the nacelle 50 in the form of streamlined or fin shape. For instance, if each aft end of the first, second, third strakes 84, 86, 88 is limited with full height, said each aft end may come gradually and smoothly towards a forward end thereof with no height in the axial direction R. However, in no limited exemplary embodiments, it should be appreciated that any aerodynamics strake geometries may be designed on the lip surface of the nacelle to control and minimize the effects of airframe borne flow. In the above exemplary embodiment, the first strake 84, the second strake 86 and the third strake 88 extend from a leading edge of the lip portion 90 at the inlet 60 in the axial direction partially to a body part 92 of the nacelle 50. The body part 92 extends circumferentially and backwardly from the lip portion 90 in the axial direction. In some other embodiments, at least one strake may just be arranged on the surface of the lip portion 90, or in another embodiment, at least one strake may just be placed on a surface of the body part 92 adjacent to the lip portion 90. However, it should be appreciated that at least one strake may be provided on the lip surface 90 of the nacelle 50 and some additional strakes are placed on the body part 92 adjacent to the lip surface 90. As discussed above, in the exemplary embodiment, the first, second, third strakes 84, 86, 88 are spaced apart from each other circumferentially. In yet some other exemplary embodiments, a plurality of aerodynamic strakes are provided on the lip surface 90 and spaced apart from each other circumferentially and aligned with each other circumferentially. In still some other exemplary embodiments, a plurality of aerodynamic strakes are provided on the lip surface 90 of the nacelle 50 and spaced apart from each other circumferentially and axially.

Figure 6:
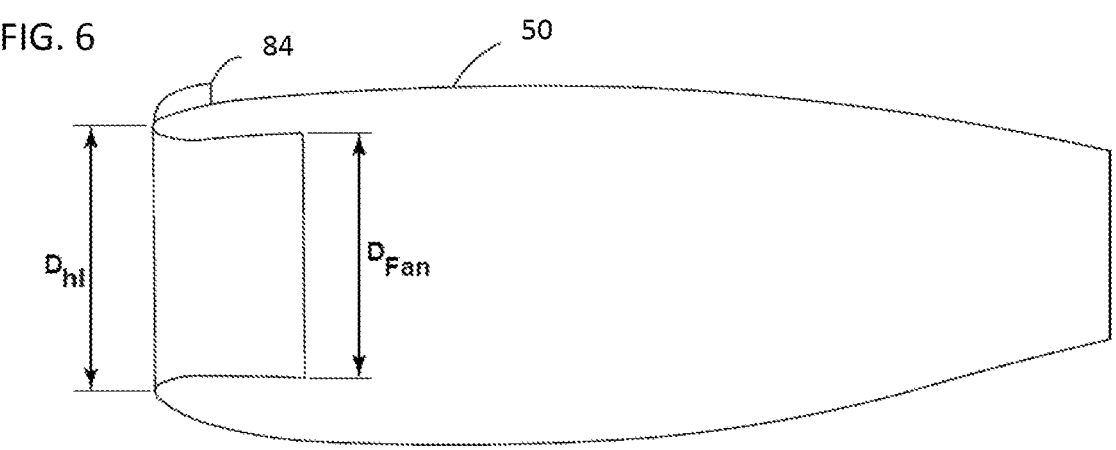
FIG. 6 is a simplified, side view of an engine in accordance with an exemplary embodiment of the present disclosure.
Figure 7:
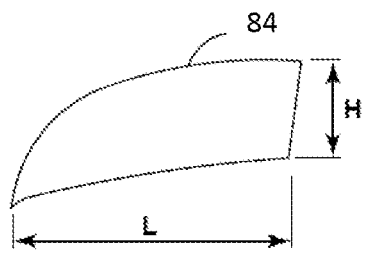
FIG. 7 is a simplified, side view of a strake of an engine in accordance with one exemplary embodiment of the present disclosure.

Turning now to FIG. 6 and FIG. 7, FIG. 6 is a simplified, side view of an engine in accordance with an exemplary embodiment of the present disclosure, and FIG. 7 is a simplified, side view of a strake of an engine in accordance with an exemplary embodiment of the present disclosure. In the exemplary embodiment, at least any one of the first, the second, the third strake 84, 86, 88 is provided with a dimension of 5 inches tall and 2 inches high. Specifically, a dimension of the at least one of the first, the second, the third strake 84, 86, 88 may be designed as:

$$0.025 < L/D_{hi} < 0.1; \text{ and/or}$$

$$0.010 < H/D_{hi} < 0.05.$$

The $D_{hi}$ is a diameter of the inlet 60 of the nacelle 50, L is the length of one of the first, second, third strake 84, 86, 88, and H is the height of one of the first, second, third strake 84, 86, 88. However, the above dimensions of each strake are just for illustration of the present disclosure, but not to limit the present invention. It should be illustrated that the strake with above dimensions may be more effective to control and minimize the effects of flow distortion to the turbofan engine and more beneficial to limit the weight and performance of the aircraft. Additionally, in an exemplary embodiment of the present invention, the $D_{fan}$ may be smaller than 140 inches to minimize an installation effects. $D_{fan}$ indicates a diameter of an area defined by the fan 40 in the radial direction R.

Figure 8:
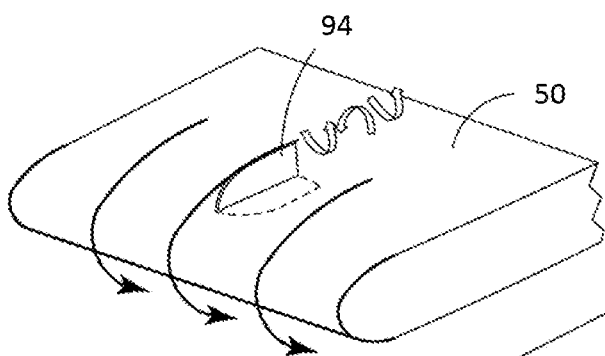
FIG. 8 is a simplified, schematic view of an outer surface of a nacelle with a strake activated in accordance with another embodiment of the present disclosure.
Figure 9:
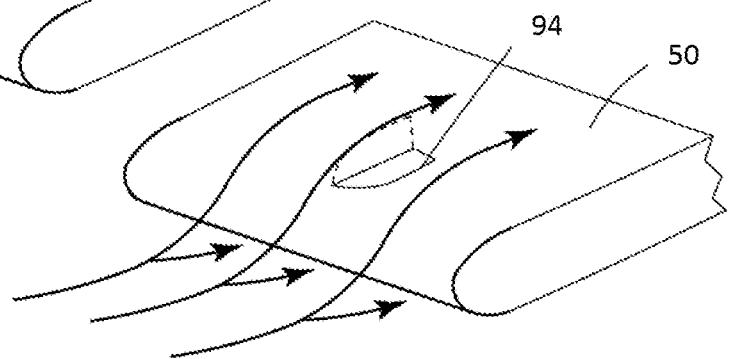
FIG. 9 is a simplified, schematic view of an outer surface of a nacelle with a strake inactivated in accordance with another embodiment of the present disclosure.

Referring now to FIG. 8 and FIG. 9, FIG. 8 is a simplified, schematic view of a partial outer surface of a nacelle with a strake activated in accordance with another embodiment of the present disclosure, and FIG. 9 is a simplified, schematic view of a partial outer surface of a nacelle with a strake inactivated in accordance with the embodiment of the present disclosure shown in FIG. 8. In the exemplary embodiment, a strake 94 capable of being activated is provided on a surface of the nacelle 50. The strake 94 is placed adjacent to the inlet 60 of the nacelle 50 to mitigate the inlet distortion and hence help mitigate operability and aeromechanics risks to the turbofan engine. The strake 94 is activated and controlled for system level weight/performance of the aircraft. Specifically, the strake 94 may be provided with a dimension of 5 inches tall and 2 inches high, as described above. In a further exemplary embodiment, a dimension of the strake 94 may be:

$$0.025 < L/D_{hi} < 0.1; \text{ and/or}$$

$$0.010 < H/D_{hi} < 0.05.$$

The $D_{hi}$ is a diameter of the inlet 60 of the nacelle 50, L is the length of strake 94, and H is the height of the strake 94. However, the above dimension of the strake 94 is just for illustration of the present disclosure, but not to limit the present invention. Specifically, the strake 94 may be activated and controlled according to different operating condition of the aircraft. For instance, the strake 94, in a deployed position, is activated and protrudes from the surface of the nacelle 50 in an aircraft ground operating condition (see FIG. 8, e.g., when the aircraft is on the ground and not moving) to eliminate a vortex around the nacelle 50. In the ground operating condition, since there is no forward speed, the engines 10 will pull air from in all directions, including upper and/or outer part of the nacelle, and then there is a risk for a vortex being formed on the surface of the nacelle 50 and being ingested into the inlet. According to the present invention, when the strake 94 is in the deployed position, the vortex can be eliminated. As shown in FIG. 9, the strake 94, in a stowed position, may be stowed on the nacelle 50 during a forward flight (cruise etc.) operating condition (e.g., the aircraft is moving with a speed other than zero). In the forward flight operating condition, most of the flow into the inlet 60 comes from an upstream location where the flow is undisturbed and vortex/distortion free. Therefore, the strake 94 should be stowed since the stake deployed will penalize the engine/aircraft performance due to implied drag generated by it. However, in a special embodiment, the strake 94 maybe selectively activated according to an expected effect to the aircraft.

Figure 10:
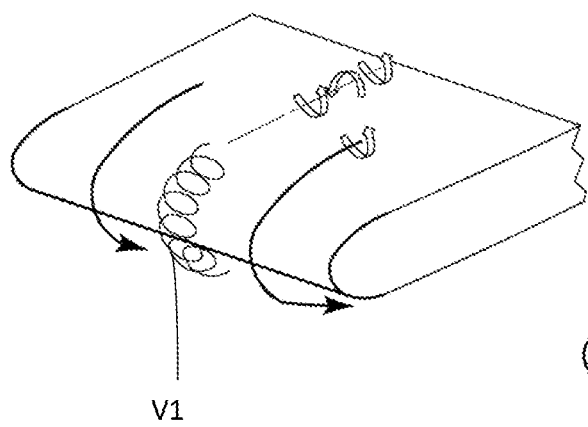
FIG. 10 is a simplified, schematic view of an outer surface of a nacelle of a conventional gas turbine engine.
Figure 11:
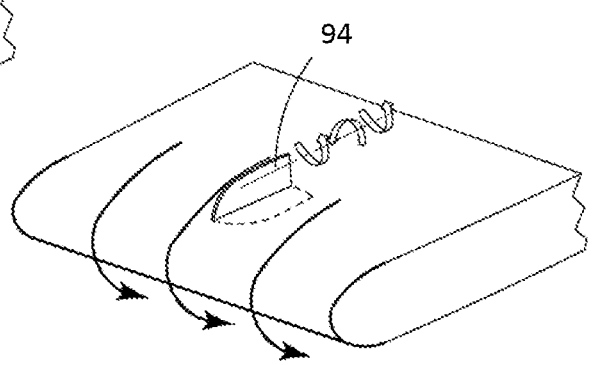
FIG. 11 is a simplified, schematic view of an outer surface of a nacelle with a strake activated in accordance still with another embodiment of the present disclosure.

As shown in FIG. 10, a simplified, schematic view of an outer surface of a nacelle of a conventional gas turbine engine, in a pure cross wind, for instance, a flow coming over a fuselage tends to separate or form a vortex V1 due to an interaction with the axial flow being generated and a fan pumping effect. The separated flow or vortex V1 ends up with being sucked into an inlet of the engine and being a main source of distortion to a turbomachinery. Further as shown in FIG. 11, a simplified, schematic view of an outer surface of a nacelle with a strake activated in accordance still with another embodiment of the present disclosure, the strake 94 adjacent to the inlet 60 of the nacelle 50 may diffuse out the vortex V1 shown in FIG. 10, and then reduce the distortion levels at the fan 40 in the engine 10 and downstream parts of the engine 10.

Figure 12:
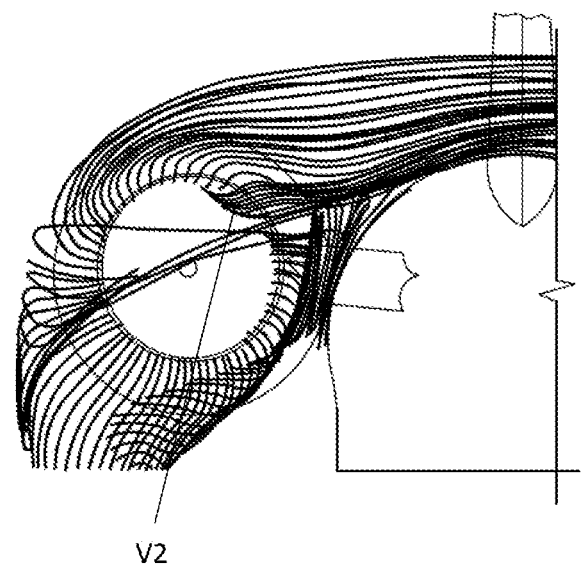
FIG. 12 is a simplified, schematic view of a flow across a fuselage of a conventional aircraft and then a flow of vortex ingested into a conventional engine.
Figure 13:
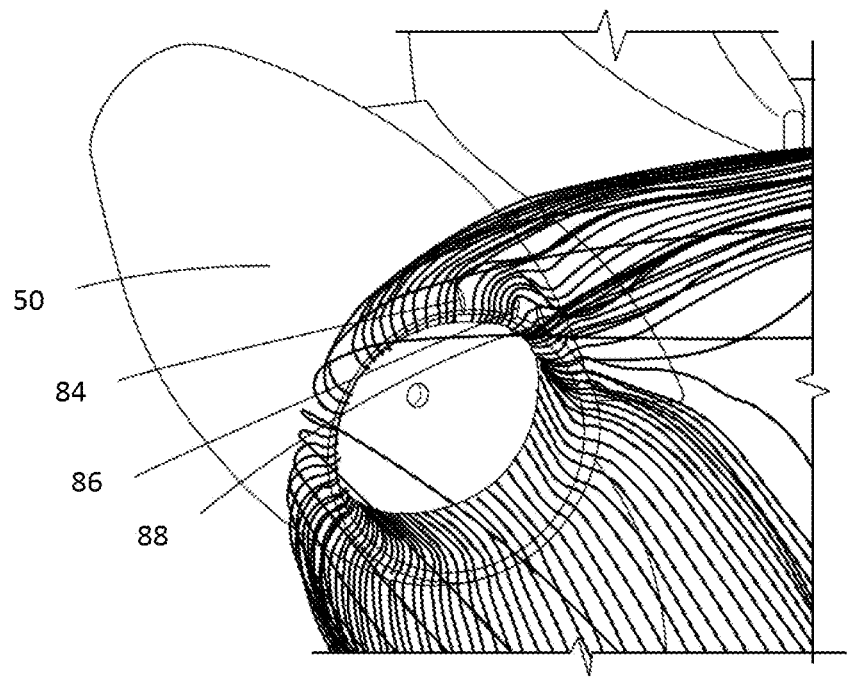
FIG. 13 is a simplified, schematic view of a flow over a fuselage in accordance an embodiment of the present disclosure.

Furthermore, as show in FIG. 12, a simplified, schematic view of a flow across a fuselage of a conventional aircraft, the flow comes across over the fuselage and then a flow of vortex V2 is produced due to an interaction with an axial flow and fan pumping effect. Further, the vortex V2 is ingested into an engine of the aircraft and damage some parts of a turbomachinery. In contrast, as shown in FIG. 13, a simplified, schematic view of a flow over a fuselage in accordance an embodiment of the present disclosure, the present invention provides a plurality of strakes 84, 86, 88 at the lip portion 90 of the nacelle 50 to diffuse out the vortex coming over the fuselage, and then to control and minimize the effects of a flow distortion and hence help mitigate operability and aeromechanics risks to the turbomachinery. As discussed above, the plurality of strakes 84, 86, 88 are provided to be passive and/or actively controlled features for a system level weight or performance of the aircraft. For instance, in some exemplary embodiments, the strake on the top position of the nacelle is arranged to be stable, and the additional strakes on the inboard side and/or the outboard side may be actively controlled and activated according to the different operating condition of the aircraft. In some other exemplary embodiment, each strake at the lip portion of the nacelle may be stable or activated.

Conventionally, an inlet distortion for an aircraft, e.g., an aircraft with aft-fuselage mounted engines, is controlled by changing the shape and size of an inlet of a nacelle of the engine to lower the risk of inlet flow separation and hence reduce the distortion levels. However, the conventional approach as described above has limited range of applicability, especially for aircraft with aft-fuselage mounted engines, with an added penalty of weight and cost. In contrast, the present invention aims to control and diffuse the distorted flow with at least one strake at a surface of a lip portion of a nacelle of an aircraft and does not require inlet lip shape to be changed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine nacelle for an aircraft defining an axial direction, a radial direction, and a circumferential direction, the engine nacelle comprising:
    an inlet for receiving an air flow to generate a thrust force for the aircraft;
    a lip portion positioned at the inlet and surrounding the inlet; and
    at least one strake provided on an outer surface of the lip portion in the radial direction and extending from a leading edge of the engine nacelle towards a downstream end in the axial direction,
    wherein the at least one strake has a deployed position in which the at least one strake is in contact with the leading edge of the engine nacelle and at least a portion thereof is on an outer side of the engine nacelle in the radial direction, and
    wherein the at least one strake is structured such that a largest surface thereof is perpendicular to the circumferential direction.

2. The engine nacelle of claim 1, wherein one of the at least one strake is provided on a top position of the outer surface of the lip portion in the radial direction of the engine nacelle.

3. The engine nacelle of claim 1, wherein the at least one strake is provided as:

$0.025 < L/Dhl < 0.1$; and/or $0.010 < H/Dhl < 0.05$;

wherein the Dhl is a diameter of the inlet of the engine nacelle, L is the length of the at least one strake, and H is the height of the at least one strake.

4. The engine nacelle of claim 1, wherein the at least one strake comprises a plurality of strakes in the form of aerodynamic geometries, the plurality of strakes spaced apart from each other in the circumferential direction of the engine nacelle.

5. The engine nacelle of claim 4, wherein the plurality of strakes are aligned with each other in the circumferential direction of the engine nacelle.

6. The engine nacelle of claim 4,
    wherein the engine nacelle is defined with an inboard side and an outboard side opposite to the inboard side;
    wherein a first strake of the plurality of strakes is provided on the inboard side; and/or
    a second strake of the plurality strakes is provided on the outboard side.

7. The engine nacelle of claim 1, wherein the at least one strake further comprises a stowed position, and is designed to switch between the deployed position and the stowed position on the outer surface of the lip portion according to different operation conditions of the aircraft.

8. A turbine engine for an aircraft, the turbine engine defining an axial direction, a radial direction, and a circumferential direction, comprising:
    an engine nacelle comprising an inlet for receiving an air flow to generate a thrust force and a lip portion positioned at the inlet and surrounding the inlet;
    an engine core received in the engine nacelle and comprising:
        a compressor section including one or more compressors;
        a combustion section located downstream of the compressor section; and
        a turbine section located downstream of the combustion section and including one or more turbines,
    wherein at least one strake is provided on an outer surface of the lip portion in the radial direction and extending from a leading edge of the engine nacelle towards a downstream end in the axial direction,
    wherein the at least one strake has a deployed position in which the at least one strake is in contact with the leading edge of the engine nacelle and at least a portion thereof is on an outer side of the engine nacelle in the radial direction,
    wherein the at least one strake is structured such that a largest surface thereof is perpendicular to the circumferential direction.

9. The turbine engine of claim 8, wherein one of the at least one strake is provided on a top position of the outer surface of the lip portion in the radial direction of the engine nacelle.

10. The turbine engine of claim 8, wherein the at least one strake further comprises a stowed position, and is designed to switch between the deployed position and a stowed position on the outer surface of the lip portion according to different operation conditions of the aircraft.

11. The turbine engine of claim 8, wherein the at least one strake comprises a plurality of strakes in the form of aerodynamic geometries, the plurality of strakes spaced apart from each other in the circumferential direction of the engine nacelle.

12. The turbine engine of claim 11, wherein the plurality of strakes are aligned with each other in the circumferential direction of the engine nacelle and extend on the outer surface of the lip portion in the axial direction of the engine nacelle.

13. The turbine engine of claim 11,
    wherein the engine nacelle is defined with an inboard side and an outboard side opposite to the inboard side;
    wherein a first strake of the plurality of strakes is provided on the inboard side; and/or a second strake of the plurality of strakes is provided on the outboard side.

14. An aircraft comprising:
    a fuselage;
    a pair of wings;
    first and second engine nacelles attached to the fuselage, the first engine nacelle defining a first axial direction, a first radial direction, and a first circumferential direction and comprising a first inlet for receiving air flow to generate a first thrust force for the aircraft and a first lip portion positioned at the first inlet and surrounding the first inlet, the second engine nacelle defining a second axial direction, a second radial direction, and a second circumferential direction and comprising a second inlet for receiving air flow to generate a second thrust force for the aircraft and a second lip portion positioned at the second inlet and surrounding the second inlet;

a first engine core received in the first engine nacelle and comprising:
- a first compressor section including one or more first compressors;
- a first combustion section located downstream of the first compressor section; and
- a turbine first section located downstream of the first combustion section and including one or more first turbines; and a second engine core received in the second engine nacelle and comprising:
- a second compressor section including one or more second compressors;
- a second combustion section located downstream of the second compressor section; and
- a turbine second section located downstream of the second combustion section and including one or more second turbines, wherein, on the first engine nacelle, at least one first strake is provided on an outer surface of the first lip portion in the first radial direction and extending from a leading edge of the first engine nacelle towards a downstream end in the first axial direction, wherein, on the second engine nacelle, at least one second strake is provided on an outer surface of the second lip portion in the second radial direction and extending from a leading edge of the second engine nacelle towards a downstream end in the second axial direction, wherein the at least one first strake has a first deployed position in which the at least one first strake is in contact with the first leading edge of the first engine nacelle and at least a portion thereof is on an outer side of the first engine nacelle in the first radial direction, wherein the at least one second strake has a second deployed position in which the at least one second strake is in contact with the second leading edge of the second engine nacelle and at least a portion thereof is on an outer side of the second engine nacelle in the second radial direction, and wherein the at least one first strake is structured such that a largest surface thereof is perpendicular to the first circumferential direction, and the at least one second strake is structured such that a largest surface thereof is perpendicular to the second circumferential direction.

15. The aircraft of claim 14,
wherein one of the at least one first strake is provided on a top position of the outer surface of the first lip portion in the first radial direction of the first engine nacelle, and wherein one of the at least one second strake is provided on a top position of the outer surface of the second lip portion in the second radial direction of the second engine nacelle.

16. The aircraft of claim 14,
wherein the at least one first strake comprises a plurality of first strakes in the form of aerodynamic geometries, the plurality of first strakes spaced apart from each other and aligned with each other in the first circumferential direction of the first engine nacelle, and wherein the at least one second strake comprises a plurality of second strakes in the form of aerodynamic geometries, the plurality of second strakes spaced apart from each other and aligned with each other in the second circumferential direction of the second engine nacelle.

17. The aircraft of claim 14,
wherein the at least one first strake is designed to be deployed or stowed on the outer surface of the first lip portion and the at least one second strake is designed to be deployed or stowed on the outer surface of the second lip portion according to different operation conditions of the aircraft.

* * * * *